United States Patent [19]

Fujii et al.

[11] Patent Number: 5,492,878
[45] Date of Patent: Feb. 20, 1996

[54] CATALYST FOR CLEANING EXHAUST GAS WITH ALUMINA, CERIA, ZIRCONIA, NICKEL OXIDE, ALKALINE EARTH OXIDE, AND NOBLE METAL CATALYST, AND METHOD FOR PREPARING

[75] Inventors: Jun Fujii; Kazunori Suzuki; Kazuo Kimura, all of Saitama, Japan

[73] Assignee: Mitsui Mining & Smelting Co., Ltd., Tokyo, Japan

[21] Appl. No.: 406,357

[22] Filed: Mar. 17, 1995

Related U.S. Application Data

[63] Continuation of Ser. No. 270,400, Jul. 5, 1994, abandoned, which is a continuation of Ser. No. 967,151, Oct. 27, 1992, abandoned.

[30] Foreign Application Priority Data

Mar. 31, 1992 [JP] Japan ..................................... 4-103978

[51] Int. Cl.$^6$ ............................. B01J 23/58; B01J 23/63; B01J 35/04; B01J 37/025
[52] U.S. Cl. ........................................ 502/304; 423/213.5
[58] Field of Search .......................... 502/304; 423/213.5

[56] References Cited

U.S. PATENT DOCUMENTS

| | | | |
|---|---|---|---|
| 4,171,287 | 10/1979 | Keith | 502/304 |
| 4,294,726 | 10/1981 | Bozon et al. | 502/304 |
| 4,965,243 | 10/1990 | Yamada et al. | 502/304 |
| 5,008,090 | 4/1991 | Joy et al. | 423/213.5 X |
| 5,057,483 | 10/1991 | Wan | 502/304 |

FOREIGN PATENT DOCUMENTS

| | | |
|---|---|---|
| 63-287555 | 11/1988 | Japan . |
| 64-58347 | 3/1989 | Japan . |
| 3207446 | 9/1991 | Japan . |

*Primary Examiner*—Douglas J. McGinty
*Attorney, Agent, or Firm*—Baker & Daniels

[57] ABSTRACT

A catalyst for cleaning exhaust gas comprises a carrier and a coated layer applied onto the surface of the carrier which comprises an aluminum oxide, a cerium oxide, a zirconium oxide, a nickel oxide, an alkaline earth metal oxide and a noble metal catalytic component. The catalyst can be prepared according to a method which comprises the steps of coating the surface of a carrier with a slurry which comprises active alumina, a cerium compound, a zirconium compound and a nickel compound, drying the coated carrier and then calcining it to complete the carrier, then impregnating the carrier with a solution comprising a catalyst component of a noble metal, drying, then immersing it in a solution of an alkaline earth metal compound, drying the immersed carrier and then calcining the carrier. The catalyst for exhaust gas-cleanup is highly sensitive to HC and CO around the theoretical mixing ratio and within the rich-region and is excellent in durability.

15 Claims, No Drawings

CATALYST FOR CLEANING EXHAUST GAS WITH ALUMINA, CERIA, ZIRCONIA, NICKEL OXIDE, ALKALINE EARTH OXIDE, AND NOBLE METAL CATALYST, AND METHOD FOR PREPARING

This is a continuation of application Ser. No. 08/270,400, filed Jul. 5, 1994, now abandoned, which was a continuation of application Ser. No. 07/967,151, filed Oct. 27, 1992, now abandoned.

BACKGROUND OF THE INVENTION

1. Field of the Invention

The present invention relates to a catalyst for cleaning up exhaust gas discharged from engines and more specifically to a monolithic catalyst for cleaning up exhaust gas, whose cleanup capacity is highly improved.

2. Description of the Prior Art

The requirements for the improvement of heat resistance and cleanup capacity of catalysts for exhaust gas cleanup have increasingly been strict recently. Recently, there have likewise been required for the development and use of exhaust gas-cleanup catalysts for motorcycles. For this reason, there have been required for the improvement of these catalysts in not only the exhaust gas-cleanup quality in the three way point, but also cleanup quality for hydrocarbons within the rich-region.

Up to now, as a catalyst excellent in heat resistance, there has been proposed an exhaust gas-cleanup catalyst prepared by wash-coating the surface of a carrier with a slurry comprising an element of the platinum group, active alumina, cerium oxide, a barium compound and a zirconium compound, followed by drying and calcination (see, for instance, Japanese Unexamined Patent Publication (hereinafter referred to as "J. P. KOKAI") No. Sho 64-58347. In addition, Japanese Patent Application Serial (hereinafter referred to as "J.P.A.") No. Hei 3-207446 discloses a catalyst in which heat deterioration of $CeO_2$ is prevented and the heat resistance thereof is improved through fixing at least one member selected from lanthanum and barium on $CeO_2$ capable of showing oxygen-storing effect (i.e., it absorbs oxygen when the $O_2$ concentration increases or the air-fuel ratio is in the lean side, while it releases oxygen when the $O_2$ concentration decreases or the air-fuel ratio is in the rich side and thus it contributes to the catalytic reaction).

However, the foregoing catalysts for exhaust gas cleanup are improved only in the oxygen-storing effect and heat resistance around the theoretical mixing ratio and insufficient in the ability of eliminating hydrocarbons and CO gas within the rich-region. Therefore, there has been required for the development of a catalyst having a good ability of eliminating hydrocarbons and CO within the rich-region as well as high durability.

SUMMARY OF THE INVENTION

The present invention has been developed for eliminating the foregoing problems associated with the conventional techniques discussed above and, accordingly, an object of the present invention is to provide an excellent catalyst for cleaning exhaust gas which is highly sensitive to hydrocarbons and CO not only around the theoretical mixing ratio but also in the rich-region and has high durability.

Another object of the present invention is to provide a method for preparing the foregoing exhaust gas-cleanup catalyst having substantially improved characteristics.

The inventors of this invention have conducted various studies to accomplish the foregoing objects, as a result, have found that a catalyst comprising a carrier for catalyst to which coated layers of specific components are applied and thus have completed the present invention.

According to an aspect of the present invention, there is provided a catalyst for cleaning up exhaust gas which comprises a carrier for catalyst and a coated layer comprising an aluminum oxide, a cerium oxide, a zirconium oxide, a nickel oxide, an alkaline earth metal oxide and a noble metal catalytic component.

According to another aspect of the present invention, there is provided a method for preparing a catalyst for exhaust gas-cleanup which comprises the steps of coating the surface of a carrier for catalyst with a slurry which comprises active alumina, a cerium compound, a zirconium compound and a nickel compound, drying the coated carrier and then calcining it to complete the carrier, then impregnating the carrier with a solution comprising a catalyst component of a noble metal, drying, then immersing it in a solution of an alkaline earth metal compound, drying the immersed carrier and finally calcining the coated carrier.

DESCRIPTION OF THE PREFERRED EMBODIMENTS

The catalyst and the method for preparing the same according to the present invention will hereinafter be described in more detail.

Examples of carriers for the catalyst usable in the present invention include metal monolithic carriers such as stainless steel and Fe-Cr-Al alloys; and ceramic monolithic carriers such as cordierite. The carrier preferably has an integrated structure such as a honeycomb construction.

Active alumina ($Al_2O_3$) used in the present invention preferably has a specific surface area ranging from 100 to 300 $m^2/g$. In addition, the cerium compounds, zirconium compounds, nickel compound and alkaline earth metal compounds may be any known ones so far as they can be converted into oxides of these metals through calcination. In this respect, the cerium compounds may be used alone or in any combination with compounds of other lanthanoid elements, such as compounds of mischmetals. Examples of cerium compounds preferably used in the present invention include cerium nitrate, cerium chloride and cerium acetate. Examples of preferred zirconium compounds are zirconium nitrate, zirconium chloride and zirconium acetate. Examples of preferred nickel compounds include nickel nitrate, nickel chloride and nickel acetate. Examples of preferred alkaline earth metal compounds are those of barium, magnesium, calcium and strontium. Preferred barium compounds are, for instance, barium nitrate, barium chloride, barium acetate and barium oxide. Preferred magnesium compounds are, for instance, magnesium nitrate and magnesium chloride. Preferred calcium compounds include, for instance, calcium nitrate, calcium chloride and calcium acetate. Preferred strontium compounds are, for instance, strontium nitrate, strontium chloride and strontium acetate.

The noble metal catalytic component used in the present invention is preferably platinum, palladium and rhodium as well as mixture thereof with a combination of rhodium with at least one member selected from platinum and palladium being more preferred.

In the method for preparing the exhaust gas-cleanup catalyst according to the present invention, a slurry is first prepared by mixing solutions each containing the foregoing cerium compound, zirconium compound or nickel compound with alumina in a predetermined mixing ratio and then milling the mixture in, for instance, a ball mill to give a slurry. Then the resulting slurry is applied onto the surface of the foregoing carrier for catalyst through the wash-coating method. The application of the noble metal component is carried out by immersing the wash-coated carrier in a solution comprising at least one noble metal catalytic component and having a predetermined concentration. The noble metal catalytic component-supporting carrier thus formed is then impregnated with an aqueous solution containing at least one alkaline earth metal compound, followed by drying and calcination to thus complete the catalyst according to the present invention.

In the catalyst of the present invention, the coat layer supported on the carrier preferably comprises 15 to 40 parts by weight of the cerium oxide, 15 to 40 parts by weight of the zirconium oxide, 2 to 10 parts by weight of the nickel oxide and 2 to 12 parts by weight of the alkaline earth metal oxide per 100 parts by weight of the aluminum oxide. Moreover, the amount of the noble metal catalytic component preferably ranges from 0.1 to 5 g per liter of the completed catalyst product. More preferably, the noble metal component is a combination of Rh with at least one member selected from Pt and Pd and the ratio: (Pt+Pd)/Rh ranges from 1/1 to 30/1.

The exhaust gas-cleanup catalyst having the foregoing composition is excellent in heat resistance because of the interaction between the components in the coat layer and further serves to substantially reduce the amounts of hydrocarbons and CO gas even within the rich-region due to the oxygen-storing effect of the highly heat-resistant $CeO_2$ and the effect of NiO which serves as a steam reforming catalyst and a catalyst for water gas shift reaction.

The present invention will be detailed below with reference to the following working Examples, but the present invention is by no means limited to these specific Examples.

EXAMPLE 1

To a ball mill, there were added 115 g of active alumina having a BET surface area of 150 $m^2/g$ and an average particle size of 30μ, cerium nitrate in an amount corresponding to 26 g of cerium oxide, nickel nitrate in an amount corresponding to 7.5 g of nickel oxide, zirconium nitrate in an amount corresponding to 26 g of zirconium oxide, boehmite alumina in an amount corresponding to 9 g of alumina and 280 g of distilled water and then the mixture was pulverized and mixed over 20 hours to give a dispersion for wash-coating. A honeycomb carrier of cordierite (400 cells; 0.34 l volume) was immersed in the resulting wash-coating liquid, followed by removal of the excess wash-coating liquid remaining in the cells through air-blowing and then drying. The processes for wash-coating and drying were repeated twice and the honeycomb carrier thus treated was then calcined at 500° C. for 2 hours. The amount of the wash-coat applied to the honeycomb carrier thus treated is 140 g per liter of the completed catalyst and the wash-coat comprised 21% by weight of $CeO_2$, 21% by weight of $ZeO_2$ and 6% by weight of NiO on the basis of the weight of the alumina. Then a platinum-P salt and rhodium chloride were dissolved in distilled water to give a solution for immersion having a platinum concentration of 1.0 g/l and a rhodium concentration of 0.2 g/l. The foregoing wash-coated carrier was immersed in 300 ml of the solution for immersion, followed by removal of the excess solution for immersion remaining in the cells of the carrier through air-blowing and then drying. Thereafter, the carrier was dipped in a hydradine solution to perform reduction thereof. Then the catalyst coated with the noble metal was immersed in an aqueous solution of barium nitrate having a barium (Ba) concentration of 34 g/l, followed by removal of the excess solution within the cells of the carrier through air-blowing, drying and then calcination at 500° C. for 2 hours to give a completed catalyst (catalyst No. 1). It was found that 0.3 g of platinum and 0.06 g of rhodium were included in the coated layer of the catalyst. Moreover, the amount of barium supported by the catalyst was 3.5% by weight as expressed in terms of the amount of barium oxide on the basis of the weight of the alumina.

EXAMPLE 2

The same procedures used in Example 1 were repeated except that acetic acid salts of cerium, nickel, zirconium and barium were substituted for the nitrates thereof used in Example 1 to give a catalyst No. 2.

EXAMPLE 3

The same procedures used in Example 1 were repeated except that chlorides of cerium, nickel, zirconium and barium were substituted for the nitrates thereof used in Example 1 to give a catalyst No. 3.

EXAMPLE 4

The same procedures used in Example 1 were repeated except that, in the solution for immersion, palladium was substituted for platinum used in Example 1 to give a catalyst No. 4.

EXAMPLE 5

The same procedures used in Example 1 were repeated except that nickel nitrate was used in an amount corresponding to 12.5 g of nickel oxide to give a catalyst No. 5. The amount of NiO included in the resulting catalyst was 10% by weight on the basis of the weight of the alumina.

EXAMPLE 6

The same procedures used in Example 1 were repeated except that nickel nitrate was used in an amount corresponding to 2.5 g of nickel oxide to give a catalyst No. 6. The amount of NiO included in the resulting catalyst was 2% by weight on the basis of the weight of the alumina.

EXAMPLE 7

The same procedures used in Example 1 were repeated except that the barium (Ba) concentration of the aqueous solution of barium nitrate was changed to 117 g/l to give a catalyst No. 7. The amount of BaO included in the resulting catalyst was 12% by weight on the basis of the weight of the alumina.

EXAMPLE 8

The same procedures used in Example 1 were repeated except that the barium (Ba) concentration of the aqueous solution of barium nitrate was changed to 19.4 g/l to give a catalyst No. 8. The amount of BaO included in the resulting catalyst was 2% by weight on the basis of the weight of the alumina.

EXAMPLE 9

The same procedures used in Example 1 were repeated except that an aqueous solution of magnesium nitrate having a magnesium (Mg) concentration of 23 g/l was substituted for the aqueous solution of barium nitrate having a barium (Ba) concentration of 34 g/l to give a catalyst No. 9. The amount of MgO included in the resulting catalyst was 3.5% by weight on the basis of the weight of the alumina.

COMPARATIVE EXAMPLE 1

The same procedures used in Example 1 were repeated except that nickel nitrate was not used in the preparation of the wash-coating solution to give a comparative catalyst No. A.

COMPARATIVE EXAMPLE 2

The same procedures used in Example 1 were repeated except that the application of barium was not carried out after the application of the noble metal catalytic component to give a comparative catalyst No. B.

EXAMPLE 10

The catalysts Nos. 1 to 9 of the foregoing Examples and the comparative catalysts No. A and No. B were subjected to a durability test under the conditions specified below and then the quality of each catalyst was evaluated under the conditions likewise specified below. The results (% conversion) thus obtained are listed in the following Table 1.

Conditions for Durability Test:
Engine: piston swept volume=2,000 cc
Catalyst Temperature: 950° C.
Durability Test Time: 50 hr.
A/F: 14.6±0.5
Space Velocity: about 90,000 hr$^{-1}$
Conditions for Quality Evaluation
Engine: piston swept volume=2,000 cc
Catalyst Temperature: 400° C.
A/F: 13.9~15.1
Space Velocity: about 90,000 hr$^{-1}$

TABLE 1

| Catalyst No. | A/F = 14.0 | | | A/F = 14.6 | | | A/F = 15.0 | | |
|---|---|---|---|---|---|---|---|---|---|
| | CO | HC | NO$_x$ | CO | HC | NO$_x$ | CO | HC | NO$_x$ |
| 1 | 25 | 34 | 93 | 90 | 92 | 94 | 96 | 88 | 28 |
| 2 | 26 | 33 | 91 | 92 | 93 | 95 | 96 | 90 | 25 |
| 3 | 24 | 32 | 90 | 89 | 90 | 93 | 96 | 88 | 24 |
| 4 | 22 | 35 | 94 | 91 | 91 | 92 | 97 | 87 | 26 |
| 5 | 19 | 28 | 88 | 85 | 87 | 90 | 94 | 85 | 22 |
| 6 | 20 | 30 | 89 | 87 | 88 | 88 | 95 | 86 | 20 |
| 7 | 19 | 29 | 89 | 85 | 88 | 89 | 93 | 86 | 21 |
| 8 | 21 | 30 | 90 | 87 | 89 | 90 | 95 | 87 | 22 |
| 9 | 20 | 28 | 90 | 86 | 87 | 89 | 93 | 85 | 21 |
| A | 14 | 23 | 83 | 82 | 83 | 86 | 91 | 82 | 18 |
| B | 16 | 26 | 85 | 83 | 84 | 85 | 92 | 81 | 19 |

HC: hydrocarbons

As seen from the data listed in Table 1, the catalyst according to the present invention exhibits excellent quality even after the high temperature durability test.

As has been explained above in detail, the catalyst of the present invention is highly sensitive to HC and CO around the theoretical mixing ratio and within the rich-region and is excellent in durability.

We claim:

1. A catalyst for cleaning exhaust gas consisting essentially of a carrier and a coated layer applied onto the surface of the carrier, which coated layer consists essentially of an aluminum oxide, a cerium oxide, a zirconium oxide, a nickel oxide, an alkaline earth metal oxide and a noble metal catalytic component, said catalyst being prepared by the steps of coating the surface of a carrier with a slurry which consists essentially of active alumina, a cerium compound, a zirconium compound and a nickel compound, drying the coated carrier and then calcining the dried coated carrier to complete the carrier, then impregnating the completed carrier with a solution consisting essentially of a catalyst component of a noble metal, drying the impregnated carrier, then immersing the dried impregnated carrier in a solution of an alkaline earth metal compound, drying the immersed carrier and then calcining the dried immersed carrier.

2. The catalyst for cleaning exhaust gas according to claim 1 wherein the coated layer applied onto the carrier comprises 15 to 40 parts by weight of the cerium oxide, 15 to 40 parts by weight of the zirconium oxide, 2 to 10 parts by weight of the nickel oxide and 2 to 12 parts by weight of the alkaline earth metal oxide per 100 parts by weight of the aluminum oxide.

3. The catalyst for cleaning exhaust gas according to claim 1 wherein the amount of the noble metal catalytic component ranges from 0.1 to 5 g per 1 l of the catalyst.

4. The catalyst for cleaning exhaust gas according to claim 3 wherein the noble metal component is a combination of Rh with at least one member selected from Pt and Pd.

5. The catalyst for cleaning exhaust gas according to claim 4 wherein the ratio: (Pt+Pd)/Rh ranges from 1/1 to 30/1.

6. The catalyst for cleaning exhaust gas according to claim 1 wherein the carrier for the catalyst is selected from the group consisting of metal monolithic carriers having integrated structure and ceramic monolithic carriers.

7. The catalyst for cleaning exhaust gas according to claim 1 wherein the alkaline earth metal is selected from the group consisting of barium, magnesium, calcium and strontium.

8. The catalyst for cleaning exhaust gas according to claim 1 wherein the carrier has an integrated structure.

9. A method for preparing a catalyst for cleaning exhaust gas comprising the steps of coating the surface of a carrier with a slurry which comprises active alumina, a cerium compound, a zirconium compound and a nickel compound, drying the coated carrier and then calcining the dried coated carrier to complete the carrier, then impregnating the completed carrier with a solution comprising a catalyst component of a noble metal, drying, the impregnated carrier then immersing the impregnated carrier in a solution of an alkaline earth metal compound, drying the immersed carrier and then calcining the dried immersed carrier.

10. The method according to claim 9 wherein the cerium compound, zirconium compound, nickel compound and alkaline earth metal compound each is selected from the group consisting of nitrate, acetate and chloride thereof.

11. The method according to claim 9 wherein the carrier for the catalyst is selected from the group consisting of metal monolithic carriers having integrated structure and ceramic monolithic carriers.

12. The method according to claim 9 wherein the active alumina has a specific surface area ranging from 100 to 300 m$^2$/g.

13. The method according to claim 9 wherein the alkaline earth metal compound is selected from the group consisting of nitrates, acetates and chlorides of barium, magnesium, calcium and strontium.

14. The method according to claim 9 wherein the noble metal catalytic component is platinum, palladium, rhodium or mixture thereof.

15. The method according to claim 14 wherein the noble metal catalytic component is a combination of rhodium with at least one member selected from platinum and palladium.

* * * * *

UNITED STATES PATENT AND TRADEMARK OFFICE
CERTIFICATE OF CORRECTION

PATENT NO. : 5,492,878
DATED : February 20, 1996
INVENTOR(S) : Jun Fujii, et. al.

It is certified that error appears in the above-indentified patent and that said Letters Patent is hereby corrected as shown below:

Title page, item [54] Title, should read--ALUMINA, CERIA, ZIRCONIA, NICKEL OXIDE, ALKALINE EARTH OXIDE, AND NOBLE METAL CATALYST, AND METHOD FOR PREPARING--.

Signed and Sealed this

Second Day of July, 1996

Attest:

BRUCE LEHMAN

*Attesting Officer*    Commissioner of Patents and Trademarks